(12) United States Patent
Parker

(10) Patent No.: US 8,425,634 B2
(45) Date of Patent: Apr. 23, 2013

(54) FIRE LOG

(76) Inventor: Walter Z. Parker, Portsmouth, VA (US)

( * ) Notice: Subject to any disclaimer, the term of this patent is extended or adjusted under 35 U.S.C. 154(b) by 1077 days.

(21) Appl. No.: 12/213,268

(22) Filed: Jun. 17, 2008

(65) Prior Publication Data

US 2009/0307968 A1  Dec. 17, 2009

(51) Int. Cl.
*C10L 5/00* (2006.01)

(52) U.S. Cl.
USPC .................... 44/606; 44/530; 44/535

(58) Field of Classification Search .............. 44/606
See application file for complete search history.

(56) References Cited

U.S. PATENT DOCUMENTS

| | | | |
|---|---|---|---|
| 4,040,796 | A | 8/1977 | Vincent et al. |
| 6,855,181 | B2 | 2/2005 | Kinnunen |
| 2002/0014036 | A1 * | 2/2002 | Chandaria ............ 44/535 |
| 2002/0139042 | A1 | 10/2002 | Thompson |
| 2006/0230673 | A1 | 10/2006 | Barford et al. |

FOREIGN PATENT DOCUMENTS

CH  697091 A5 * 4/2008

OTHER PUBLICATIONS

Finnish candle финские свечи. http://www.youtube.com/watch?v=E8sa1IILHus. Nov. 1, 2006.*
Finnish Log, Canadian Campire, Swedish Fire?????. http://answers.yahoo.com/question/index?qid=20061218083719AACFDsV, Mar. 15, 2007.*
Machine Translation of CH 697091A5.*
Machine translation of CH 697091 A5.*
Schweden-Feuer, http://web.archive.org/web/20041025070329/http://www.kroetenloch.de/Schweden-Feuer/Schweden-Feuer.html, Oct. 25, 2004.*
Fackel, http://www.sac-basel.ch/dropbox/cms/files/Fackeln_01.PDF Jul. 2000.*

* cited by examiner

*Primary Examiner* — Ellen McAvoy
*Assistant Examiner* — Ming Cheung Po
(74) *Attorney, Agent, or Firm* — Richard C. Litman

(57) ABSTRACT

A fire log includes a single fire log cut in a specific design to enable easy ignition and sustenance of a self-contained campfire. The single log is designed to stand vertically and may range from twenty-four to seventy-two inches in height depending on diameter. In most instances, four vertical, diametrical cuts are made in the log forming eight pie-slice segments. The cuts extend from the top surface of the log downward toward the base of the log. The vertical cuts stop short of the entire length of the log leaving approximately 25% of the length uncut. The uncut portion forms the base of the log. One of the segments is cut horizontally at its lower end adjacent the top of the base so that the segment can be removed from the log for air flow control.

10 Claims, 3 Drawing Sheets

FIRE LOG

BACKGROUND OF THE INVENTION

1. Field of the Invention

The present invention generally relates to flammable devices. More specifically, the present invention is drawn to a log having pre-designed cuts formed therein to enable a controlled, self-contained fire.

2. Description of the Related Art

One of the great enjoyments of life is that of sitting around a blazing log fire on a crisp day or evening, toasting marshmallows and/or roasting hotdogs while partaking in delightful conversation and storytelling with family and friends. However, this scenario has a drawback in that it is often difficult to ignite the fire logs and control their burn-rate, thereby creating an amount of frustration and consternation. Stacking an array of logs according to some theoretical design and utilizing tinder to ignite the stacked array has not proven to be consistently reliable. Employing artificial logs does not produce the same aura (aroma and sound) as that of a natural log. Campfire aficionados the world over would certainly welcome a natural log that could be quickly and easily ignited and burned at a controlled rate to produce a satisfying fire. Thus, a fire log solving the aforementioned problems is desired.

SUMMARY OF THE INVENTION

The fire log is a flammable device comprising a single fire log cut in a specific design to enable easy ignition and sustenance of a self-contained campfire. Although pine and oak are preferred, the fire log of the instant invention can be fabricated from virtually any type of wood. The single log is designed to stand vertically and may range from twenty-four to seventy-two inches in height depending on diameter. It has been determined that a minimum diameter of nine inches is necessary for effectiveness. In most instances, four vertical, diametrical cuts are made in the log forming eight pie-slice segments. Larger diameter logs may require additional cuts for maximum effectiveness. The cuts extend from the top surface of the log downward toward the base of the log with a slight angle at the ends of the cuts. The vertical cuts stop short of the entire length of the log leaving approximately 25% of the length uncut. The uncut portion forms the base of the log. One of the segments is cut horizontally at its lower end adjacent the top of the base so that the segment can be removed from the log for air flow control as will be further explained below.

Accordingly, the invention presents a device wherein an easily ignitable, self-contained campfire can be produced from a single log. The log includes a removable segment that enables the control of air flow to increase or decrease flame intensity. The invention provides for improved elements thereof in an arrangement for the purposes described that are inexpensive, dependable and fully effective in accomplishing their intended purposes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
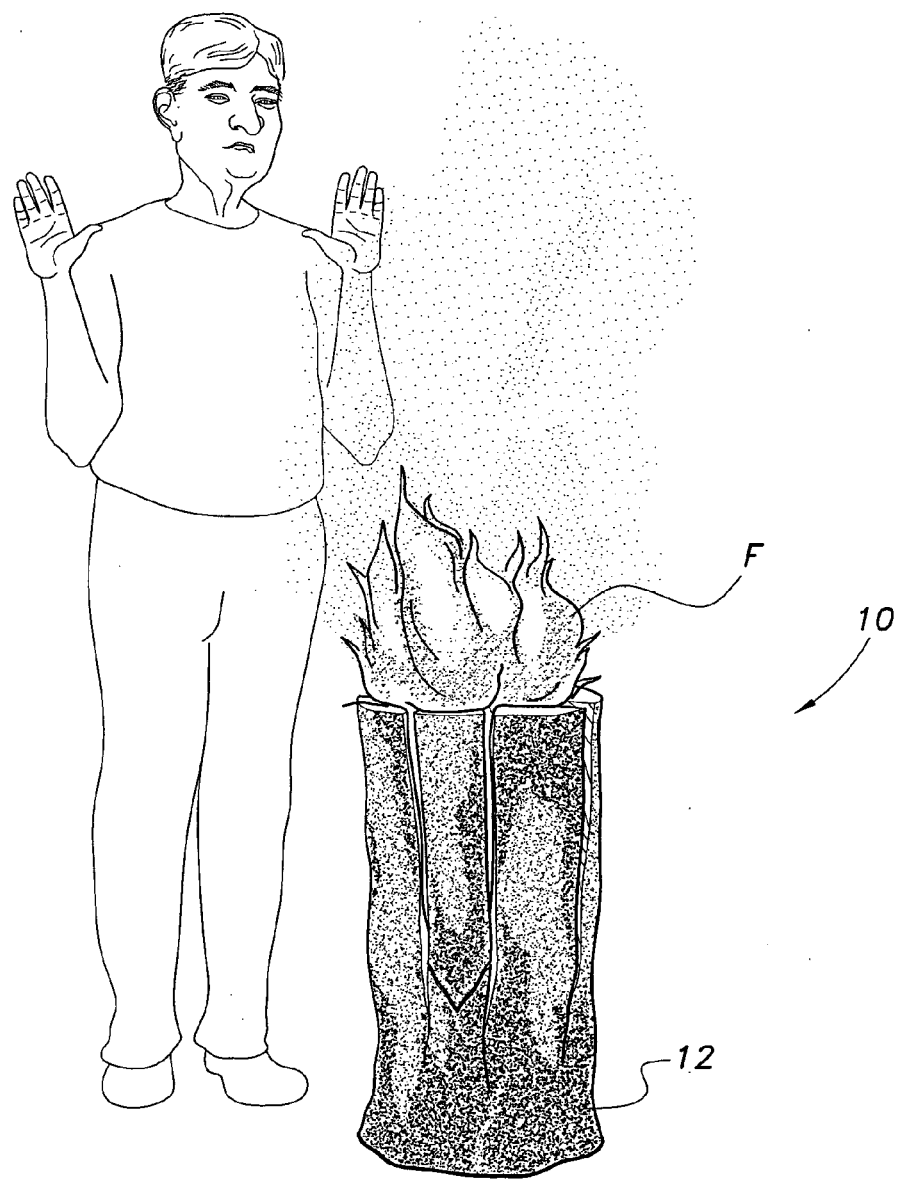
FIG. 1 is an environmental, perspective view of a fire log according to the present invention.
Figure 2:
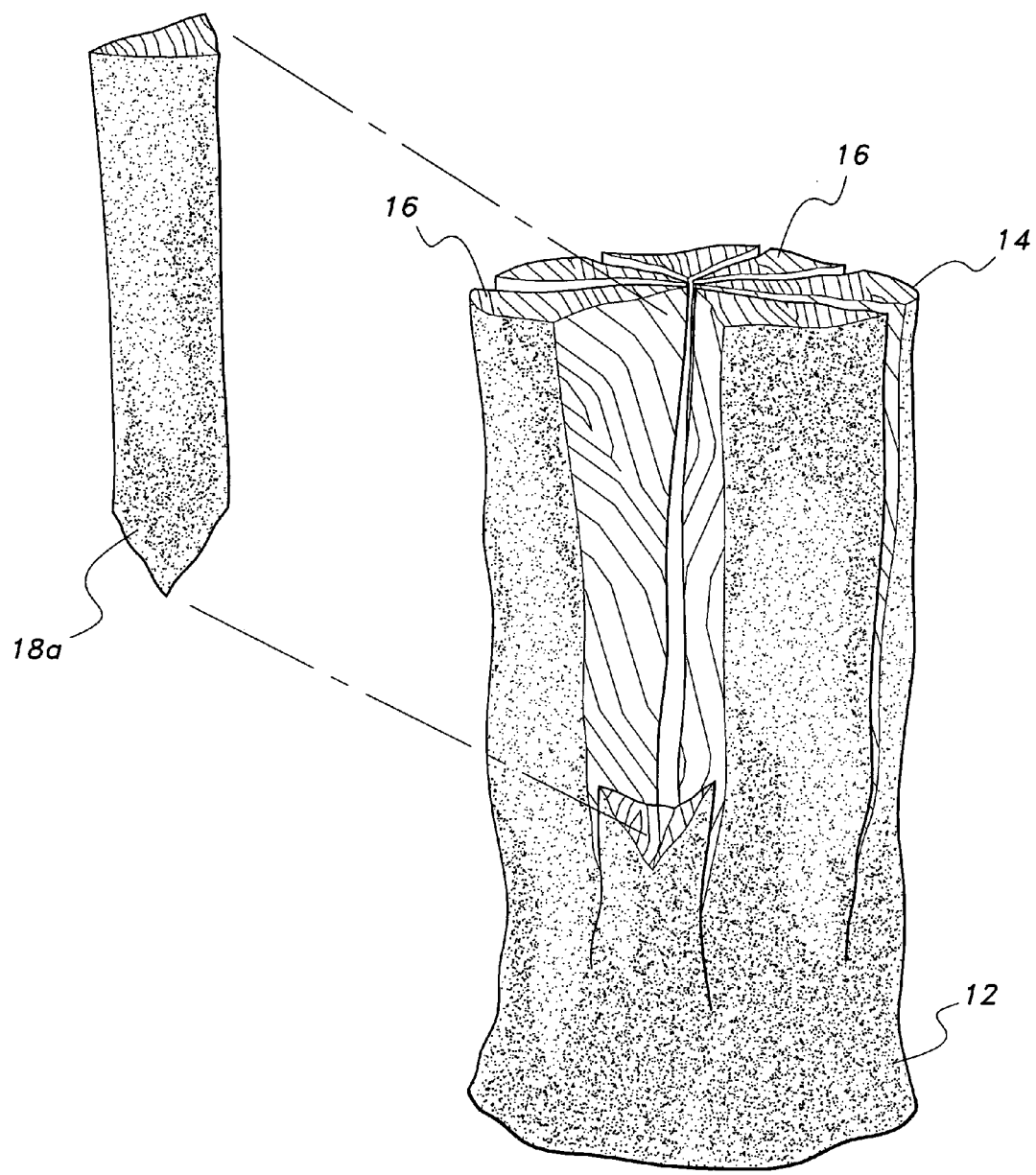
FIG. 2 is an exploded, perspective view of a fire log according to the present invention.
Figure 3:
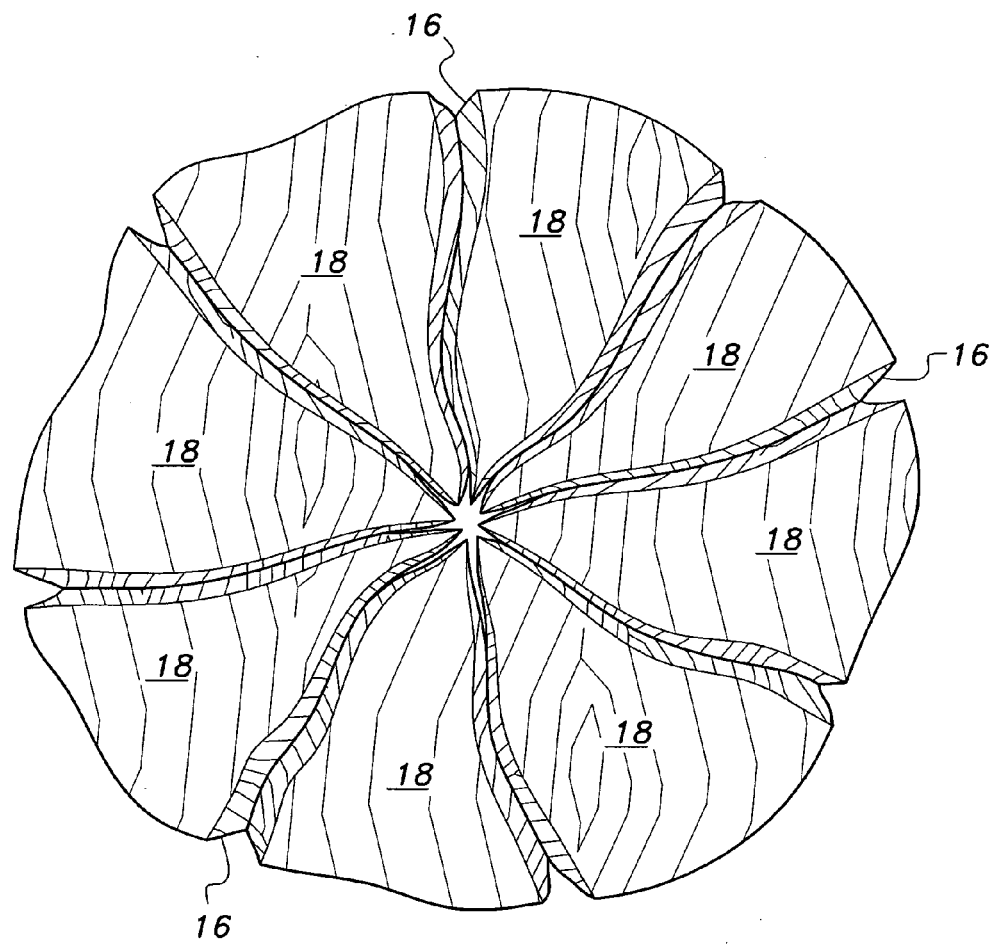
FIG. 3 is a top view of a fire log according to the present invention.

Attention is directed to FIGS. 1-3 wherein the fire log is indicated generally at 10. Fire log 10 comprises a single log having a base 12 and an upper surface 14. As indicated above, the height of log 10 can range from twenty-four to seventy-two inches. Logs in this height range produce the most satisfying flame/user positioning. Diametrical cuts 16 are made across upper surface 14 of log 10. Cuts 16 extend downward toward base 12 and terminate at a point whereby approximately 25% of the logs length remains uncut, which uncut portion forms the base 12. For logs having small and medium diameters, it has been determined that four diametrical cuts 16 are needed. The four diametrical cuts will create eight pie-shaped segments 18. One of the segments 18a is cut horizontally at its lower end toward the center of the log so that this segment can be removed and replaced as desired. As indicated above, larger diameter logs may require more than four cuts to insure effectiveness.

In use, segment 18a is temporarily removed before the log is ignited. A small amount of charcoal igniter fluid can then be added the top of the base at the central area thereof. If insect control is desired in lieu of roasting foods, a small amount of citronella may be added to the center portion where all the cuts meet. The log is then lit and removed segment is replaced and is shifted inward or outward to control airflow and thereby control the size and intensity of the flame F.

It is to be understood that the present invention is not limited to the embodiment described above, but encompasses any and all embodiments within the scope of the following claims.

I claim:

1. A fire log, comprising a log made from wood, the log having a length, a diameter, an upper surface and a base, the base having a top, the log having a plurality of diametrical cuts formed in the upper surface, the cuts extending downwardly along the length of the log and terminating at the top of the base, the cuts forming pie-shaped segments in the wood log, wherein one of said pie-shaped segments is further cut horizontally at its lower end adjacent the top of the base so that the one segment can be removed from the log for igniting the log and then replaced and shifted inward or outward to control airflow and thereby control the size and intensity of the flame.

2. The fire log according to claim 1, wherein said cuts are formed diametrically across the log.

3. The fire log according to claim 1, wherein said base has a length approximately 25% of the length of said log.

4. The fire log according to claim 1, wherein the length of said log ranges from twenty-four inches to seventy-two inches.

5. The fire log according to claim 1, wherein said log has a diameter of at least nine inches.

6. The flammable device according to claim 1, wherein said base having a length about 25% of the length of said log, the length of said log being between about twenty-four inches to seventy two inches.

7. The flammable device according to claim 1, wherein said plurality of diametrical cuts consists of four diametrical cuts defining eight elongated, pie-shaped segments in said log.

8. A method of making a flammable campfire device, comprising the steps of:
- securing a wood log having a length between twenty-four and seventy-two inches, a top surface and a base, the base having a top;
- making diametrical cuts through the top surface downwardly along the length to the top of the base, thereby forming a plurality of pie-shaped segments in the log;
- making a horizontal cut to a lower end of one of the pie-shaped segments adjacent the top of the base;
- removing the horizontally cut pie-shaped segment, thereby exposing an area at the top of the base; and
- adding a chemical to the log in the area at the top of the base.

9. The method of making a flammable campfire device according to claim 8, wherein said base has a length about 25% of the length of said log, said added chemical being charcoal igniter fluid.

10. The method of making a flammable campfire device according to claim 8, wherein said base has a length about 25% of the length of said log, said added chemical being citronella.

* * * * *